UNITED STATES PATENT OFFICE.

HENRY D. HIBBARD, OF PLAINFIELD, NEW JERSEY.

METHOD OF MAKING STEEL.

1,051,840.   Specification of Letters Patent.   Patented Jan. 28, 1913.

No Drawing.   Application filed January 31, 1912.   Serial No. 674,467.

*To all whom it may concern:*

Be it known that I, HENRY D. HIBBARD, a citizen of the United States of America, and residing at Plainfield, in the county of Union and State of New Jersey, have invented a certain new and Improved Method of Making Steel, of which the following is a specification.

My invention relates to an improved process of making steel, particularly applicable to the making of manganese steel, the object of my invention being to provide a process in which manganese steel scrap may be used without material loss of the manganese present in the scrap.

In the present steel making processes in which manganese steel scrap forms part of the charge, it is customary to eliminate and thus waste the manganese by oxidation, since the presence of the manganese seriously hinders the elimination of the carbon, while it is usually necessary to eliminate at least some of the carbon in order that too much shall not remain in the steel. Therefore to remove the carbon, it has been necessary to first eliminate the manganese. The present process aims to utilize the manganese steel scrap in the charge, without wasting its valuable manganese contents.

The basis of the present process is the step of melting the manganese steel scrap while it is covered by a bath of decarbonized iron, so that the latter protects the manganese from oxidation while fusion is proceeding.

Assuming that the process is carried out in an electric furnace provided with auxiliary heating means, the operations may be substantially as follows: The manganese steel scrap is first charged into the furnace and brought to red heat by the auxiliary heating means, at which temperature important oxidation of the charge begins. A quantity of molten decarbonized iron, from any suitable source, is then flowed into the furnace submerging as completely as possible the hot manganese scrap and thus protecting it from oxidation by the air or the slag. This charge of decarbonized iron should not contain much, if any, more than 15 parts of carbon in ten thousand, and preferably less than 10 parts. After the decarbonized iron has been charged into the furnace, the whole charge is melted, preferably by switching on the furnace an electric current. This combined charge when melted will contain substantially all of the manganese in the scrap and the percentage may be ascertained readily by a test analysis. If ordinary steel is to be made the charge may be so proportioned that no further addition of manganese will ordinarily be required. If manganese steel in the usual commercial understanding of this expression, is to be made, a further quantity of manganese, preferably in the form of ferro-manganeses, is added to bring it up to the usual proportion of from 11 to 14 per cent. in accordance with the predetermined desired composition. This addition will be large enough to supply manganese for the cover bath of decarbonized iron as well as to replace such as may have unavoidably oxidized in the melting of the scrap. For example, if the charge consists of 40% manganese steel scrap and 60% decarbonized iron, then ferro-manganese is added in quantity sufficient to give the 60% of decarbonized iron the desired composition for manganese steel and to replace the small proportion unavoidably lost in the melting of the scrap.

The process may be carried out in a Siemens regenerative furnace. In this case a bath of decarbonized iron is prepared by the usual methods, using ordinary low-manganese materials such as pig iron and steel scrap in such proportions as economy dictates. The manganese steel scrap is added after this bath has been decarbonized to the desired degree above indicated, and preferably while the bath is at a temperature well above the melting point. The scrap is charged into the molten bath and submerged as completely as possible, especial care being requisite when employing a furnace of this type by reason of the fact that a large quantity of oxygen is always present and the danger of oxidation of the manganese is greater than in an electric furnace of the type first described. After the melt is complete ferro-manganese is added in the manner above mentioned to secure the desired percentage for manganese steel, if the latter is to be produced.

In the following claims the expression manganese steel is to be understood as referring to the product commercially so known and containing from 11 to 14 per cent. ferromanganese.

I claim as my invention:—

1. In the process of making manganese steel, the formation of a charge by covering a quantity of manganese steel scrap with fused decarbonized iron containing not appreciably more than fifteen parts of carbon in ten thousand, whereby the manganese of the scrap is protected from oxidation during fusion, substantially as described.

2. In the process of making manganese steel, the formation of a charge by covering a quantity of manganese steel scrap with fused decarbonized iron containing not appreciably more than fifteen parts of carbon in ten thousand, whereby the manganese of the scrap is protected from oxidation during fusion, and after the melt has been completed, adding ferro-manganese in quantity sufficient to bring the manganese content of the decarbonized iron to the desired proportion and to replace the manganese unavoidably oxidized in the melting of the scrap.

3. In the process of making manganese steel, the formation of a charge by heating a quantity of manganese steel scrap to not more than red heat in a furnace, and then flowing over said heated scrap a quantity of molten iron containing not appreciably more than 15 parts of carbon in ten thousand.

4. In the process of making manganese steel in an electric furnace provided with auxiliary heating means, the formation of a charge by heating a quantity of manganese steel scrap to not more than red heat by the application of the auxiliary heating means, flowing a quantity of molten decarbonized iron over said heated scrap and completing the melt by the application of the electric heating element of the furnace.

In testimony whereof I have signed my name to this specification, in the presence of two subscribing witnesses.

HENRY D. HIBBARD.

Witnesses:
WALTER ABBE,
L. H. GROTE.